United States Patent
Kallara et al.

(10) Patent No.: US 7,797,915 B1
(45) Date of Patent: Sep. 21, 2010

(54) SYSTEM TO CLEAR STUCK REELS ON GRASS MOWING MACHINE

(75) Inventors: Jacob C. Kallara, Fort Mill, SC (US); Clement V. Godbold, Rock Hill, SC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/499,193

(22) Filed: Jul. 8, 2009

(51) Int. Cl.
*A01D 41/14* (2006.01)
*A01D 41/127* (2006.01)
*A01D 46/08* (2006.01)

(52) U.S. Cl. .......... 56/10.2 R; 318/54; 701/67

(58) Field of Classification Search .......... 56/11.2, 56/10.2 R, 249, 10.2 G; 460/2, 6; 241/30, 241/225, 34, 28; 477/167, 174, 18; 701/67, 701/68, 22; 180/65.1, 65.25; 340/684; 318/54, 318/39, 400.01
See application file for complete search history.

(56) References Cited

U.S. PATENT DOCUMENTS

| | | | | |
|---|---|---|---|---|
| 3,973,379 A | * | 8/1976 | Ecker et al. .......... | 56/11.9 |
| 4,430,847 A | * | 2/1984 | Tourdot et al. .......... | 56/10.7 |
| 4,793,561 A | * | 12/1988 | Burda .......... | 241/36 |
| 5,394,678 A | * | 3/1995 | Lonn et al. .......... | 56/10.2 H |
| 5,461,290 A | * | 10/1995 | Tice .......... | 318/266 |
| 5,491,391 A | * | 2/1996 | Bahr et al. .......... | 318/39 |
| 5,527,218 A | * | 6/1996 | Van den Bossche et al. .......... | 460/20 |
| 5,601,512 A | * | 2/1997 | Scag .......... | 477/111 |
| 6,247,296 B1 | * | 6/2001 | Becker et al. .......... | 56/11.2 |
| 6,381,932 B1 | * | 5/2002 | Clauss .......... | 56/10.2 J |
| 7,520,452 B2 | * | 4/2009 | Watano et al. .......... | 241/36 |
| 2004/0128050 A1 | * | 7/2004 | Rieger et al. .......... | 701/67 |
| 2007/0034295 A1 | * | 2/2007 | Chapman .......... | 144/356 |
| 2007/0257141 A1 | * | 11/2007 | Stelter et al. .......... | 241/30 |

* cited by examiner

*Primary Examiner*—Árpád Fábián-Kovács

(57) ABSTRACT

A system to clear stuck reels on a grass mowing machine with a reversible electric or hydraulic motor connected to a cutting reel. The reel motor can rotate in a forward direction and a reverse direction. A controller provides electric signals to the reel motor, and commands the motor to reverse direction if the reel motor does not rotate in the forward direction at a rotational speed at least as high as a preset minimum speed, or rotate a pre-specified number of revolutions.

17 Claims, 2 Drawing Sheets

SYSTEM TO CLEAR STUCK REELS ON GRASS MOWING MACHINE

FIELD OF THE INVENTION

This invention relates to cutting reels on grass mowing machines, and more specifically to a system for clearing reels that are stuck, such as reels that are clogged with clippings, debris, thatch or other material.

BACKGROUND OF THE INVENTION

Grass mowing machines for golf courses and other grass or turf fields where a high quality of cut is required typically use one or more cutting reels with seven, eleven or a similar number of spiral blades on a horizontal shaft. Each blade cuts grass by rotating in very close proximity to a horizontal, stationary bed knife. On many such grass mowing machines including fairway mowers, riding greens mowers and walk behind greens mowers, the shaft of each cutting reel is rotated using a hydrostatic motor or electric motor. However, the motor may not provide sufficient torque to start rotating the reel if it becomes stuck. For example, the reel may be stuck because of rust or because the cutting blade and/or bed knife is clogged with excessive debris, thatch, clippings or other material.

If the cutting reel is stuck and does not start to rotate, the operator may need to take action to clear the reels and prevent damage to the reel motor. For example, the operator may try to restart the reel by manually cycling the system several times. However, if the reel remains stuck after manually cycling the system, the operator may need to clean the reel or remove the material from the reel by hand. To do this safely, the operator should shut off the engine, power take off (PTO) and/or power to the reel motor controller.

A system to clear stuck reels is needed that is efficient and does not reduce productivity when attempting to start. A system to clear stuck reels is needed that is safe, fast, effective, and does not require operator intervention.

SUMMARY OF THE INVENTION

A system for clearing cutting reels on a grass mowing machine that are stuck is provided. The system includes an electric or hydraulic reel motor for rotating the cutting reel in a forward direction and a reverse direction, and a motor controller connected to the reel motor that alternates a forward rotation command and a reverse rotation command to the reel motor until the reel motor rotates at least a specified amount in the forward direction.

The system increases productivity when attempting to start a stuck reel, is safe and effective, and does not require the operator to turn off the PTO, reel motor controller, and/or engine to clean the reel or remove or material that is lodged between the reel blades and bed knife.

DESCRIPTION OF THE PREFERRED EMBODIMENT

Figure 1:
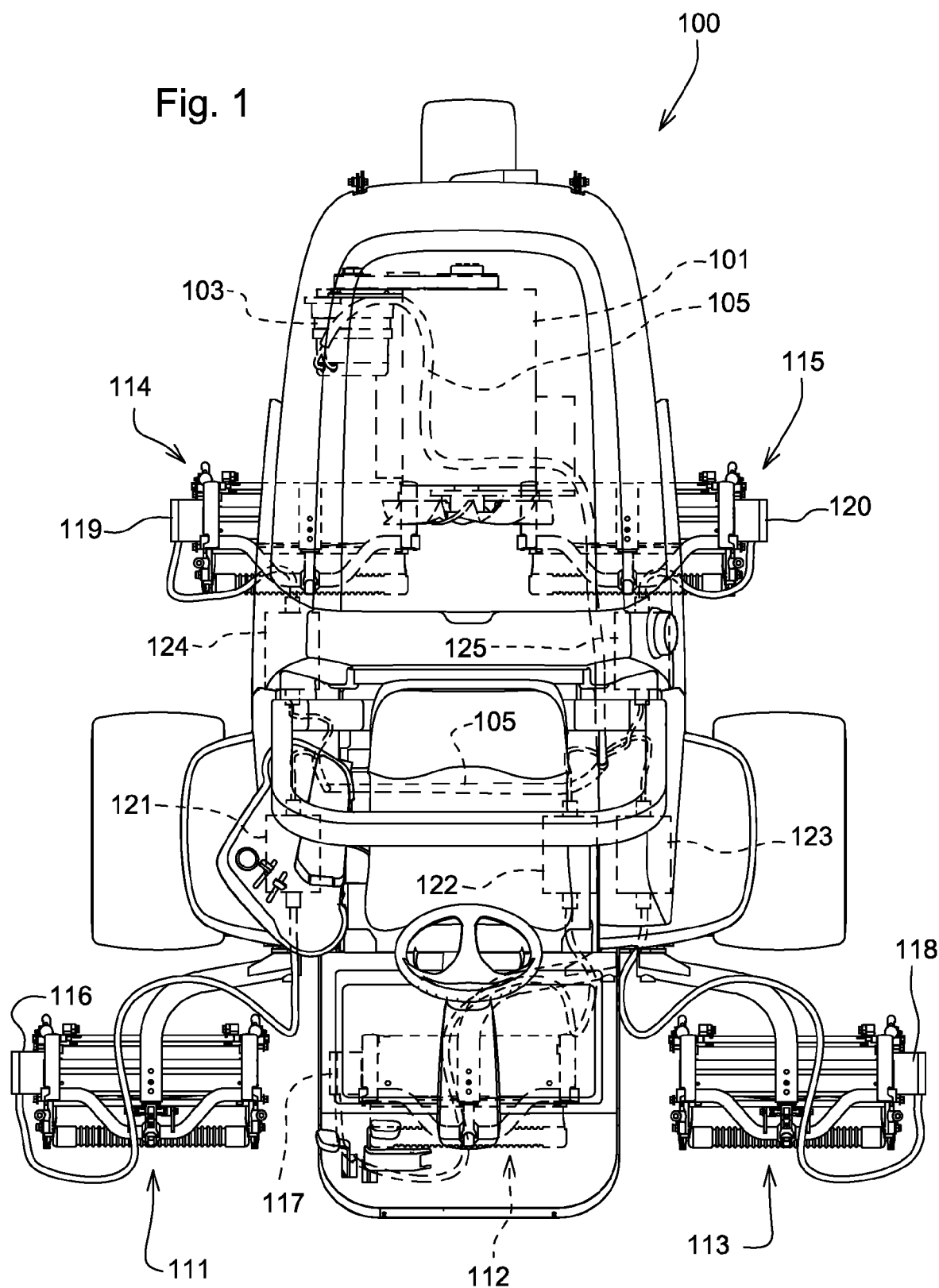
FIG. 1 is a top view of a lightweight fairway mower having a system to clear stuck reels according to a first embodiment of the invention.
Figure 2:
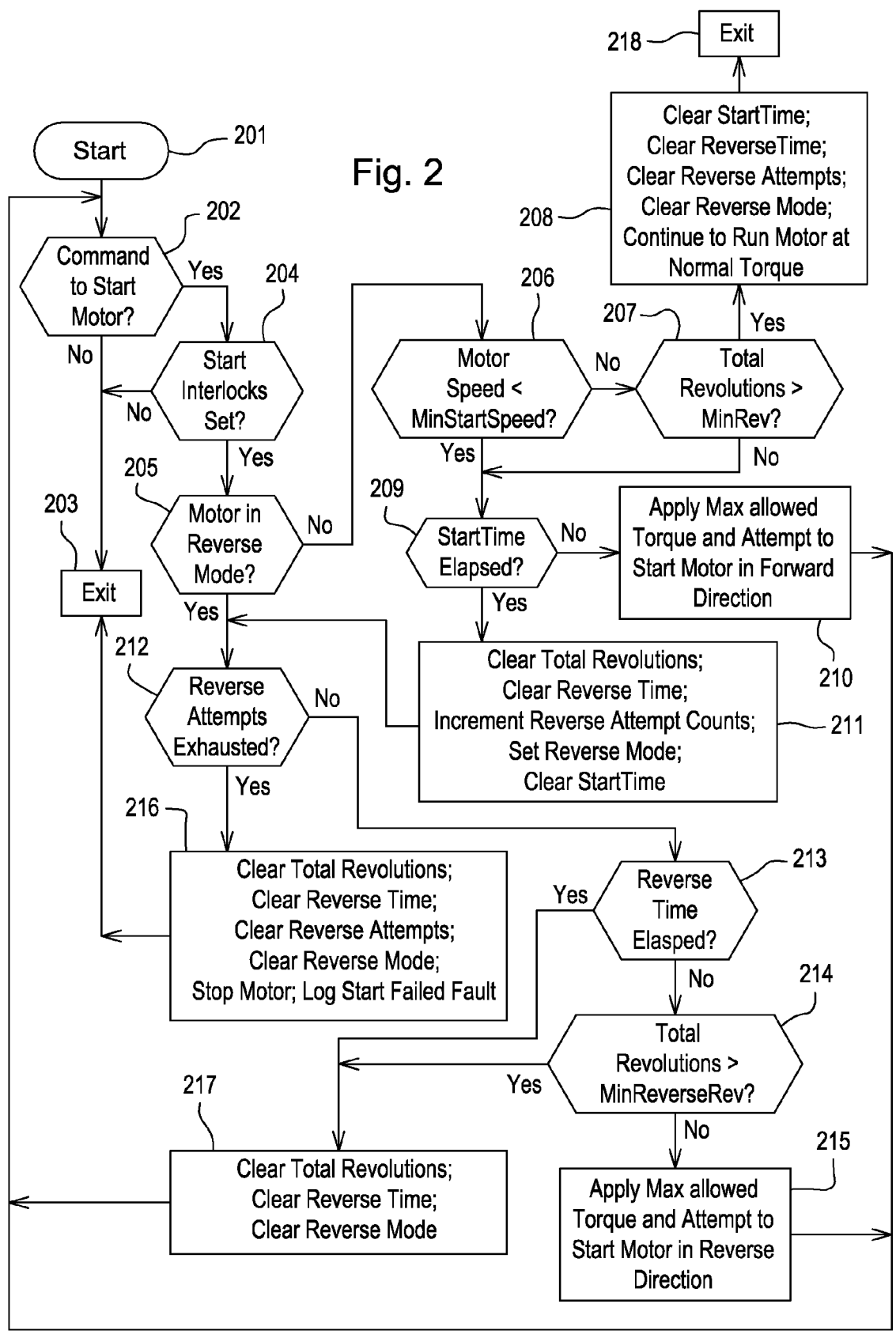
FIG. 2 is a flowchart of a system to clear stuck reels according to the first embodiment.

FIGS. 1 and 2 show a preferred embodiment of a system for clearing stuck reels on a grass mowing machine. In one embodiment, the system may be used on lightweight fairway mower 100. Additionally, the system may be applied to other grass mowing machines such as riding greens mowers having three cutting reels, or walk behind greens mowers having a single cutting reel.

In one embodiment, the grass mowing machine may have an internal combustion engine 101 or other power supply, that rotates an electrical power generating source, such as belt-driven Lundell alternator 103. The system for clearing stuck reels also may be used on grass mowing machines in which electrical power is supplied by batteries or other electrical power generating components. The alternator or other electrical power generating components may be connected to electrical bus 105. Alternatively, the system may include a hydraulic circuit that transmits power to hydraulic motors through hydraulic lines. The system may include reel motor controllers 121-125 which control electric or hydraulic reel motors 116-120 to operate reel cutting units 111-115.

In one embodiment, the electric power generating component may be a Lundell alternator that is belt-driven by the internal combustion engine or other power source and provides 48-V, 180-amps when the cutting reels are operating normally without being stuck by clippings, debris or other material. Alternatively, the reel motor controllers and/or reel motors may be connected to a battery powered circuit that may be recharged by an alternator, generator or other source.

In one embodiment, each reel motor controller may regulate power to a reversible electric reel motor, and the electric reel motor may also provide a motor electrical position signal to the controller. For example, each reel motor may use Hall effect sensors, or other electronic position sensors, to convey the motor position to a controller. Alternatively, the system for clearing stuck reels may use a single controller unit, or pair of controllers, to operate and command all of the cutting reel motors.

In an alternative embodiment, the reel motor controller may control a reversible hydraulic reel motor, and the hydraulic reel motor may provide a motor position signal to the controller. For example, each reel motor may use a sensor to detect reel speed, hydraulic flow or pressure to convey the motor position to the controller. The controller takes input from the sensor(s) and provides commands to a valve system to operate the motor in the forward or reverse direction.

FIG. 2 is a flow chart of a system for clearing stuck reels on a grass mowing machine according to a preferred embodiment of the invention. The system may be implemented in software in controllers for each of multiple cutting reel motors of the grass mowing machine, for example. Or the system may be implemented using software in a single controller that controls several cutting reel motors. The system for clearing stuck reels is not limited to a particular type of mower, nor is it limited to a system with individual reel motor controllers for each cutting reel.

In one embodiment, one or more reel motor controllers may identify if a reel is stuck at reel startup by measuring the startup speed and the number of revolutions of the reel motor with respect to some fixed, configurable, time. Alternatively, the reel motor controller may detect a stuck reel by measuring the current/torque (phase current) for a fixed duration of time. Or, in the case of a hydraulic reel motor, the reel motor controller may detect a stuck reel from a hydraulic pressure or flow sensor. A reel motor controller, upon identifying a stuck reel, may execute a series of attempts to unclog the reel. Each attempt may include reversing the reel rotational direction and applying maximum torque for a fixed duration of time and/or revolutions of the motor, and then trying to start the reel again in the forward direction with maximum torque. If the reel still fails to start, the reel motor controller may repeat the cycle for a configurable number of attempts.

More specifically, in the embodiment of FIG. 2, block 201 represents the start of a routine or set of software instructions that a reel motor controller, or a controller for several reel motors, may use to run the clear stuck reels function. The controller may start executing the clear stuck reels function at intervals such as every 5 milliseconds. In block 202, the controller determines if there is a command to start one or more of the reel motors. For example, a reel motor controller may receive the start reel motor command from a vehicle controller in response to an operator actuating a reel start or enable switch using the grass mowing machine's operator controls. In the case of a fairway mower, for example, the start reel motor switch also may move and/or lower one or more cutting reels to their mowing positions. If the reel motor controller(s) do not receive a command to start the reel motor, the reel motor controller(s) may exit the clear stuck reels function at block 203.

If there is a command to start the reel motor or motors in block 202, the reel motor controller(s) determines if start interlocks are set in block 204. Examples of start interlocks include but are not limited to a park brake switch, operator presence switch, traction control neutral switch, and/or an indicator if the bus voltage is at a specified voltage. Information regarding start interlocks may be provided by a vehicle controller to each reel motor controller, for example. If the reel motor controller determines that one or more start interlocks are not satisfied, the reel motor controller may exit the clear stuck reels function at block 203.

If the start interlocks are set, the reel motor controller determines if the reel motor is already in the reverse mode in block 205. If the reel motor is not in reverse mode, the reel motor controller determines if the reel motor speed is less than a pre-specified minimum start speed in block 206. The minimum start speed may be a preset value stored in the reel motor controller as a specified number of revolutions of the reel motor during some fixed, configurable time. For example, the reel motor speed may be a time between pulses provided to the controller by Hall effect sensors on the reel motor, or a flow measured by a hydraulic flow sensor. The minimum start speed should be substantially less than the normal running speed of the reel motor. For example, the minimum start speed should be less than half of the normal running speed of between about 2500 rpm and about 3000 rpm, and most preferably should be less than about 5% of the maximum speed.

If the reel motor speed is greater than the preset minimum start speed in block 206, the controller also may determine if the total forward revolutions of the reel motor are greater than a preset minimum revolutions value in block 207. This step may be executed to verify that the cutting reel motor has turned in the forward direction, because the reel motor speed information may be insufficient or inaccurate. For example, the total forward revolutions may be the number of electrical revolutions provided by one or more Hall sensors, representing a number of mechanical revolutions or fractions of revolutions of the cutting reel, such as ¼ revolution.

If the reel motor speed is greater than the preset minimum start speed in block 206, and the total forward revolutions are greater than the preset minimum revolutions in block 207, this indicates the reel motor is running acceptably in the forward mode and the cutting reel is not stuck. The controller clears the registers for the forward start time period, reverse start time period, reverse attempts, and reverse mode in block 208. Additionally, the controller continues to run the reel motor in the forward run mode at normal torque, which may be less than half of the maximum possible torque. The controller then exits the function in block 218.

If, however, the reel motor speed is less than the preset minimum start speed in block 206, or the total forward revolutions are less than the preset minimum revolutions in block 207, this indicates the reel motor is not running acceptably in the forward mode because the cutting reel may be stuck. The reel motor controller determines if the forward start time period has elapsed in block 209. The forward start time period may be a preset period of time, such as 250 milliseconds, during which the system may continue attempting to start the reel motor in the forward direction. The forward start time period may run from a previous block at or near the start of the routine such as block 204.

If the forward start time period has not elapsed, the reel motor controller may provide a signal to the reel motor applying maximum allowed torque in attempt to start turning the reel motor in the forward direction in block 210. For example, the maximum allowed torque may be based on the highest voltage that can be applied by the electrical system for the load on the reel motor, without exceeding maximum allowable current. The controller then returns to the block 202 at the start of the function.

If, however, the forward start time period has elapsed before the reel motor reaches the minimum start speed in block 206 and the forward revolutions in block 207, the reel motor controller then may attempt to start the reel motor in reverse. Before attempting to start the reel motor in reverse, the controller clears the registers for total forward revolutions and reverse start time periods in block 211. Additionally, the reel motor controller increments the reverse attempt count, sets the reverse mode to indicate it is reversing the direction of the reel motor, and clears the forward start time period register. The reel motor controller also determines if the number of reverse attempts already is exhausted in block 212. For example, a maximum of three reverse attempts may be preset in the reel motor controller. The controller also checks if the reverse start time period has elapsed in block 213. The reverse start time period may be a preset period of time, such as 250 milliseconds, during which the system may continue attempting to start the reel motor in the reverse direction. Additionally, the controller determines if the total reverse revolutions of the reel motor is greater than the preset minimum reverse revolutions in block 214. This step may verify that the cutting reel motor actually has turned in the reverse direction. For example, the total reverse revolutions may be based on information from one or more Hall sensors representing mechanical revolutions or fractions of revolutions of the cutting reel motor, such as ¼ revolution.

If the number of reverse attempts does not exceed the reverse attempt count, and the reverse start time period has not elapsed, and the reverse revolutions is less than the preset minimum, the reel motor controller may provide an electrical signal to the reel motor applying maximum allowed torque in attempt to start the motor turning in the reverse direction in block 215. For example, the maximum allowed torque may be based on the highest voltage that can be applied by the electrical system for the load on the reel motor, without exceeding maximum allowable current. The controller then returns to block 202 at the start of the function.

If, however, if the controller determines that the number of reverse attempts has been exhausted in block 212, the controller then may clear the registers for total forward revolutions, reverse start time period, number of reverse attempts, and reverse mode in block 216. Additionally, the controller may stop the reel motor and log a start failed fault, which may include a visible or audible warning to the operator. The reel motor controller then exits the function at block 203.

If the controller determines the reverse start time period has elapsed in block 213, then the controller may clear the total revolutions, the reverse start time period, and reverse mode in block 217, and return to block 202. Or, if the controller determines the total reverse revolutions are greater than the minimum reverse revolutions in block 214, the controller also may clear the same registers in block 217 and return to block 202.

If a reel motor does not start in the forward direction, the system is programmed to start it in reverse. After each of one or more attempts to start the reel motor in the reverse direction for a specified time period, the system may try again to start it in the forward direction. Trying to start the reel motor in reverse at maximum allowed torque, then in forward at maximum allowed torque, has been found to be an effective system and methodology to start a reel that is stuck due to rust or grass, debris or thatch that may clog the reel.

Having described the preferred embodiment, it will become apparent that various modifications can be made without departing from the scope of the invention as defined in the accompanying claims.

The invention claimed is:

1. A system to clear stuck cutting reels on a grass mowing machine, comprising:
   a reversible motor connected to a cutting reel that can rotate the cutting reel in a forward direction and in a reverse direction;
   a controller providing commands to the reel motor;
   a sensor connected between the controller and the reel motor that senses the rotational speed of the reel motor and provides the rotational speed to the controller;
   wherein the controller provides a command to reverse the direction of the reel motor if the rotational speed in the forward direction at startup of the reel motor is not at least as high as a preset minimum speed.

2. The system of claim 1 wherein the controller provides a second command to reverse the direction of the reel motor back to the forward direction.

3. The system of claim 1 wherein the controller provides a command to reverse the direction of the reel motor if the reel motor does not rotate a specified number of revolutions at startup of the reel motor.

4. The system of claim 1 wherein the controller provides a command to reverse the direction of the reel motor for a preset time period.

5. The system of claim 1 wherein the controller provides a plurality of commands to reverse the reel motor after each instance when the reel motor does not rotate in the forward direction at a rotational speed at least as high as a preset minimum speed.

6. The system of claim 1 further comprising a plurality of reel motors and controllers connected to the grass mowing machine.

7. The system of claim 1 wherein the commands include an increased torque command to the reel motor.

8. A system to clear stuck cutting reels on a grass mowing machine, comprising:
   a motor connected to the cutting reel for rotating the cutting reel in a forward direction and a reverse direction;
   a controller connected to the motor;
   a position sensor connected between the controller and the motor that senses the motor position and provides the motor position to the controller;
   the controller alternating a forward rotation command and a reverse rotation command to the motor until the motor rotates at least a specified amount in the forward direction at startup of the motor.

9. The system of claim 8 wherein the controller discontinues providing the reverse rotation command after a preset number of reverse rotation commands.

10. The system of claim 8 wherein each of the forward and the reverse rotation commands have a specified time duration.

11. The system of claim 8 wherein each of the forward and reverse rotation commands applies a maximum torque to the motor until the motor rotates at least the specified amount in the forward direction, after which the controller provides a forward rotation command having a lower than maximum torque.

12. A system to clear stuck cutting reels on a grass mowing machine, comprising:
    a reel motor connected to a controller that provides an electrical startup signal commanding the reel motor to start rotating in a forward direction,
    a sensor connected between the reel motor and the controller to indicate how much the reel motor has rotated in the forward direction after the startup signal;
    the controller providing another electrical signal commanding the reel motor to start rotating in the reverse direction if the reel motor fails to start rotating in the forward direction.

13. The system of claim 12 wherein the reel motor position provided by the sensor to the controller includes a motor rotational speed.

14. The system of claim 12 wherein the reel motor position provided by the sensor includes a number of revolutions of the reel motor.

15. The system of claim 12 wherein the controller provides an electrical signal with a maximum torque until the reel motor starts rotating in the forward direction, after which the controller provides an electrical signal with less than the maximum torque.

16. The system of claim 12 wherein the controller repeatedly provides each electrical signal commanding the reel motor to start rotating in a forward direction, followed by each electrical signal commanding the reel motor to start rotating in the reverse direction.

17. The system of claim 12 wherein the controller discontinues providing electrical signals commanding the reel motor to start rotating in the forward direction and reverse direction after a specified number of forward and reverse commands.

* * * * *